United States Patent
Wu et al.

(10) Patent No.: US 8,054,239 B2
(45) Date of Patent: Nov. 8, 2011

(54) HONEYCOMB-BACKED ARMORED RADOME

(75) Inventors: Kuang-Yuh Wu, Plano, TX (US); James A. Pruett, Allen, TX (US); Gary F. Wahlquist, McKinney, TX (US); Brian W. Johansen, McKinney, TX (US); David R. Bishop, Nevada, TX (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 12/258,209

(22) Filed: Oct. 24, 2008

(65) Prior Publication Data

US 2010/0103072 A1   Apr. 29, 2010

(51) Int. Cl.
*H01Q 1/42* (2006.01)
(52) U.S. Cl. ..................................... 343/872
(58) Field of Classification Search .................. 343/873, 343/700 MS, 702, 872
See application file for complete search history.

(56) References Cited

U.S. PATENT DOCUMENTS

| | | | |
|---|---|---|---|
| 2,854,374 A | 12/1973 | McMillan et al. | |
| 3,780,374 A | 12/1973 | Shibano et al. | |
| 4,358,772 A | 11/1982 | Leggett | |
| 4,613,540 A | 9/1986 | Traut et al. | |
| 4,783,666 A * | 11/1988 | Ast et al. | 343/872 |
| 4,797,683 A * | 1/1989 | Kosowsky et al. | 343/872 |
| 4,868,040 A | 9/1989 | Hallal et al. | |
| 5,182,155 A * | 1/1993 | Roe | 428/116 |
| 5,408,244 A | 4/1995 | Mackenzie | |
| 6,107,976 A * | 8/2000 | Purinton | 343/872 |
| 6,767,606 B2 * | 7/2004 | Jackson et al. | 428/118 |
| 7,688,278 B2 * | 3/2010 | Frenkel | 343/872 |
| 7,817,099 B2 * | 10/2010 | Wu et al. | 343/872 |
| 2002/0113168 A1 * | 8/2002 | Rukavina et al. | 244/129.3 |
| 2004/0246195 A1 | 12/2004 | Usami et al. | |
| 2009/0286040 A1 * | 11/2009 | Gerken et al. | 428/116 |

FOREIGN PATENT DOCUMENTS

| | | |
|---|---|---|
| DE | 11 07 299 B | 5/1961 |
| DE | 102 57 370 B3 | 6/2004 |
| EP | 1 710 218 A1 | 10/2006 |
| EP | 1 796 210 A1 | 6/2007 |
| GB | 2 336 807 A | 4/1998 |
| WO | WO 2006/011133 A1 | 2/2006 |

OTHER PUBLICATIONS

Wu, et al.;U.S. Appl. No. 12/016,867; entitled "Broadband Ballistic Resistant Radome"; (Spec—30 pages and Drawings—10 pages), Jan. 18, 2008.
Wu, et al.; U.S. Appl. No. 11/297,999; entitled "Broadband Ballistic Resistant Radome";(Spec—22 pages and Drawings—7 pages), Dec. 8, 2005.
European Search Report for Application No. 09150813.5-2220/2081252, 8 pages, Dec. 22, 2009.
European Search Report for Application No. 06256063.6-2220, 9 pages, Mar. 9, 2007.

* cited by examiner

*Primary Examiner* — Michael C Wimer
(74) *Attorney, Agent, or Firm* — Baker Botts L.L.P.

(57) ABSTRACT

According to one embodiment, a radome configured to extend over an opening of an antenna and includes a rigid layer overlying a ballistic-resistant layer. The rigid layer includes a honeycomb base material having a plurality of holes that extend transversely to the surface of the ballistic-resistant layer.

6 Claims, 3 Drawing Sheets

HONEYCOMB-BACKED ARMORED RADOME

TECHNICAL FIELD OF THE DISCLOSURE

This disclosure generally relates to radomes, and more particularly, to an armored radome that is configured to extend over an opening of an antenna for protection of its radiating elements and associated electronics.

BACKGROUND OF THE DISCLOSURE

Antennas, such as those that operate at microwave frequencies, typically have multiple radiating elements having relatively precise structural characteristics. To protect these elements, a covering referred to as a radome may be configured between the elements and the ambient environment. These radomes shield the radiating elements of the antenna from various environmental aspects, such as precipitation, humidity, solar radiation, or other forms of debris that may compromise the performance of the antenna. In addition to structural rigidity, radomes may also possess relatively good electrical properties for allowing transmission of electro-magnetic radiation through its structure.

SUMMARY OF THE DISCLOSURE

According to one embodiment, a radome is configured to extend over an opening of an antenna and includes a rigid layer overlying a ballistic-resistant layer. The rigid layer includes a honeycomb base material having a plurality of holes that extend transversely to the surface of the ballistic-resistant layer.

Some embodiments of the disclosure may provide numerous technical advantages. For example, one embodiment of the armored radome may include a rigid layer made of a honeycomb base material that provides enhanced protection from armament, such as bullets or shrapnel while impedance matching ballistic-resistant layer to antenna over any suitable frequency range. The honeycomb base material has a plurality of holes that may be filled with a syntactic foam material with a relatively low dielectric constant value. The combined dielectric constant values of the rigid layer and the ballistic-resistant layer may be adjusted to match the effective impedance of the armored radome to its associated antenna over a suitable frequency range.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Antennas that are used to propagate electromagnetic radiation are often covered with radomes for protection from damage due to operation in uncontrolled environments. For antenna arrays having multiple radiating elements that operate in the microwave frequency range, the radomes may be positioned over an opening of the antenna array such that electro-magnetic radiation passes through freely while shielding its relatively delicate elements and associated electronics from the ambient environment. Thus, radomes typically include low radio-frequency (RF) loss materials, such as ceramics to not unduly affect the radiation pattern of the antenna. In relatively harsh environments, such as those typically encountered in military confrontations, radomes should have a generally robust structure to withstand impacts from bullets, shrapnel, and other similar forms of damaging projectiles. These characteristics may limit the type of materials from which radomes are made.

Figure 1A:
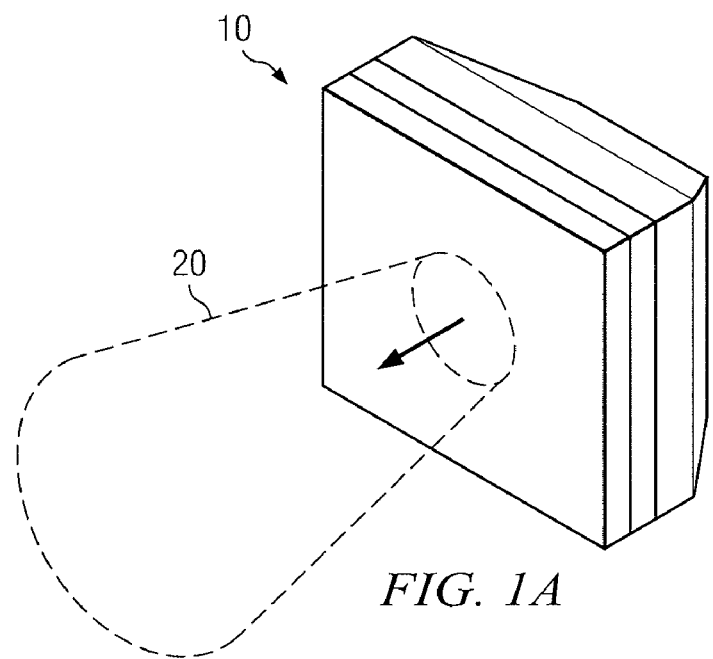
FIG. 1A is a perspective view of one embodiment of an armored radome according to the teachings of the present disclosure that is configured over the opening of an antenna.
Figure 1B:
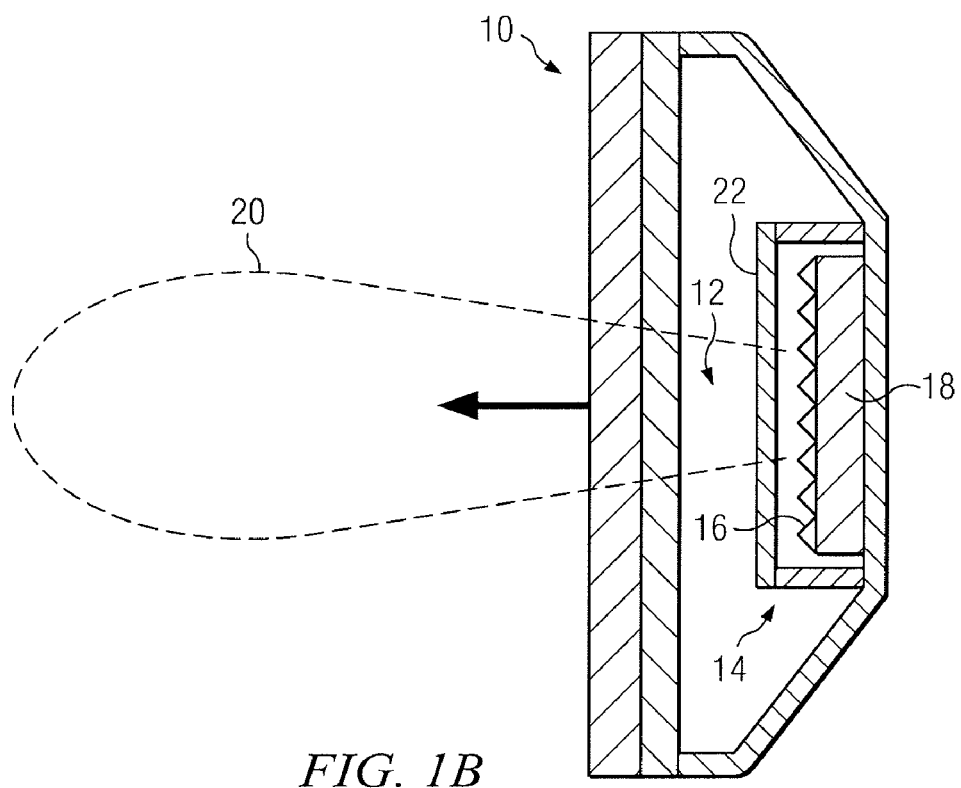
FIG. 1B is a cross-sectional, side elevational view of the radome and antenna of FIG. 1A.

FIGS. 1A and 1B show one embodiment of an armored radome 10 that may provide a solution to this problem and other problems. Armored radome 10 is disposed over an antenna electronic unit 14. Antenna electronic unit 14 has a plurality of radiating elements 16, associated electronics 18, and an environmental radome 22. Radiating elements 16 are configured to transmit and/or receive electromagnetic radiation in the form of a radiation pattern 20 through armored radome 10. Radiation pattern 20 generally represents a relative electro-magnetic field intensity level at a locus of angular orientations relative to radiating elements 16. An environmental radome 22 may be included that is disposed between armored radome 10 and radiating elements 16 for protection from airborne debris, such as precipitation or dust. As will be described in detail below, armored radome 10 has a physically robust structure for protecting antenna electronic unit 14 from ballistic impact through its aperture 12 while not unduly affecting the radiation pattern 20 generated by antenna electronic unit 14.

In the particular embodiment shown, antenna electronic unit 14 is a microwave antenna array, such as an active electronically scanned array (AESA) in which its radiating elements 16 generate a radiation pattern 20 according to the combined radiation patterns of each of its radiating elements 16. In other embodiments, antenna electronic unit 14 may be any device that is adapted to transmit or receive electromagnetic radiation at any desired frequency. In the particular embodiment shown, armored radome 10 is generally flat; however, armored radome 10 may have other shapes, such as a curved shape for enhanced scan angle deviation of antenna electronic unit 14 or for enhanced rigidity of radome's 10 structure.

Figure 2:
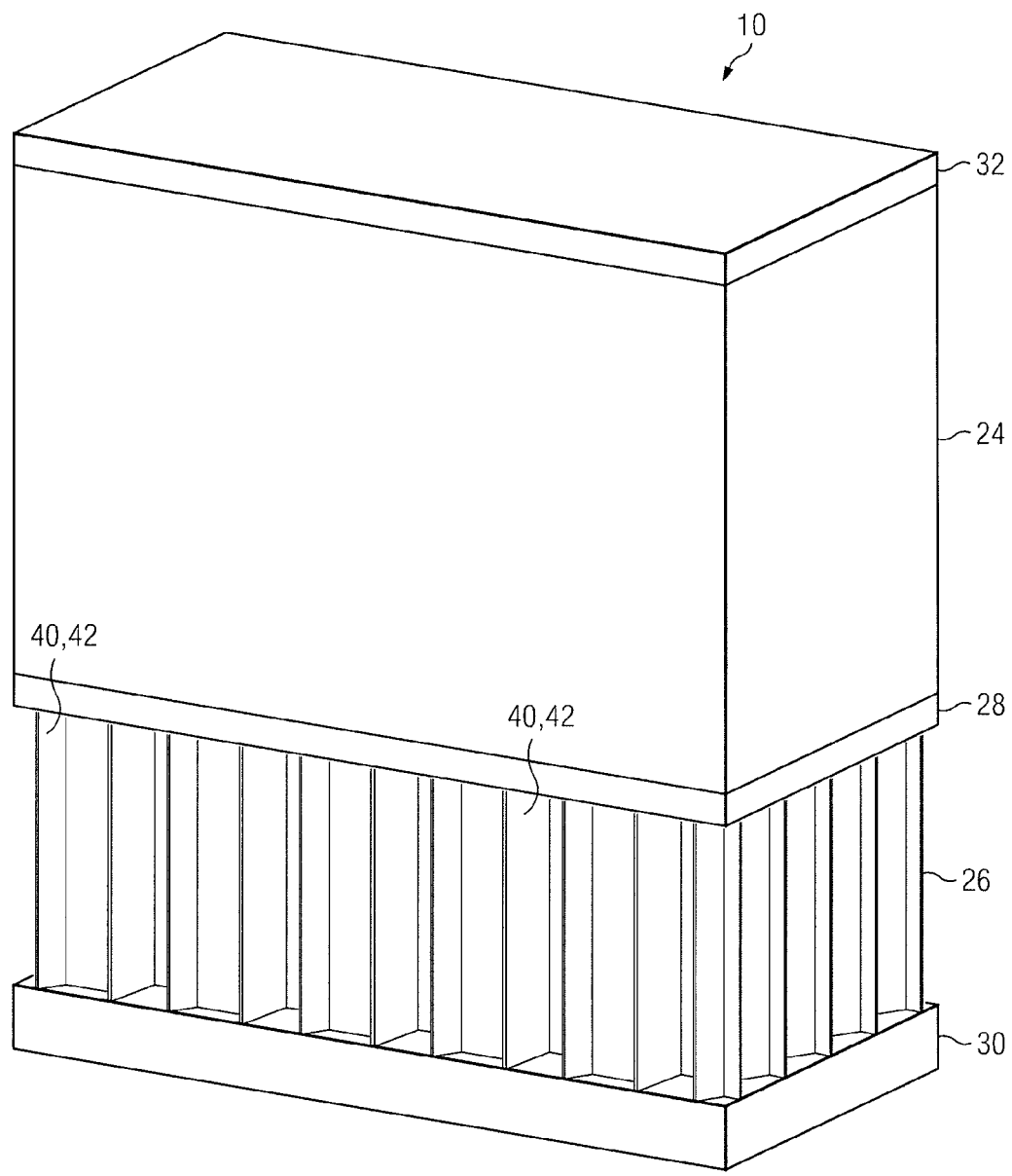
FIG. 2 is an enlarged, cross-sectional view of the various layers comprising the armored radome of FIGS. 1A and 1B.

FIG. 2 is an enlarged, cross-sectional, perspective view of a portion of armored radome 10 of FIG. 1. Armored radome 10 includes a ballistic-resistant layer 24 and a rigid layer 26 that are disposed adjacent each other through an intermediate layer 28 and bounded by backing layers 30 and 32. Ballistic-resistant layer 24 provides impact resistance for armored radome 10 while rigid layer 26 enhances the stiffness of ballistic-resistant layer 24. Intermediate layer 28 and/or backing layers 30 and 32 are optional and may be provided for impedance matching of radome 10 according to one or more desired operating frequency ranges. In some embodiments, intermediate layer 28, backing layer 30, and backing layer 32 may have a tensile strength that reduces cracking of ballistic-resistant layer 24 and/or rigid layer 26 due to impact by a projectile, such as a bullet or shrapnel.

Ballistic-resistant layer 24 may be formed of any structurally robust material having a relatively high dielectric constant, such as aluminum-oxide or silicon-nitride. Known ceramics including aluminum-oxide as a constituent material generally have relatively high dielectric constant values that may be greater than six. Aluminum-oxide is relatively impermeable to water, a characteristic that may enhance its resistance to changes in permittivity due to exposure to precipitation or other types of moisture that may collect on armored radome 10. According to one particular embodiment, ballistic-resistant layer 24 may be approximately 1.0 inch thick to provide sufficient resistance from projectiles. Ballistic-resistant layer 24, however, may have any thickness suitable for resisting impacts from projectiles while not unduly affecting radiation pattern 20 of antenna electronic unit 14.

Rigid layer 26 is a composite structure having a honeycomb base material including a plurality of holes 40 that extend transversely relative to the surface of ballistic-resistant layer 24. This structure of honeycomb base material may provide enhanced stiffness of armored radome 10 in a direction normal to its surface. In the particular embodiment shown, holes 40 are approximately ⅛ inch wide having a cross-sectional shape that is essentially hexagonal; however, other embodiments of honeycomb base material may have holes 40 of any suitable size with a circular, square, rectangular, or other suitable cross-sectional shape.

Holes 40 are filled with a syntactic foam material 42. The syntactic foam material 42 displaces air from holes 40, which may reduce the armored radome's 10 susceptibility to changes in permittivity due to changes in ambient humidity or exposure to other forms of moisture. In one embodiment, syntactic foam material 42 is a closed-cell matrix including a plurality of microspheres that are bonded together with a suitable bonding agent, such as polyamide, polyethylenimine, or acrylate. Syntactic foam materials 42 of this type may enhance the relative stiffness of rigid layer 26 while maintaining a dielectric constant relatively close to that of air.

The thicknesses and constituent materials forming the ballistic-resistant layer 24, rigid layer 26, intermediate layer 28, backing layer 30, and backing layer 32 may be selected for a desired frequency band of operation. That is, the insertion loss and dielectric constant exhibited by each layer may be tailored by adjusting its thickness or constituent material such that armored radome 10 exhibits an overall loss tangent and impedance that is acceptable within the desired frequency range. In one example, the radome's resistance to a particular type of ballistic threat, such as shrapnel generated from a grenade blast, may be improved by increasing the relative thickness of rigid layer 26. This incremental increase in thickness, however, may cause the overall loss tangent of armored radome 10 to exceed acceptable limits at a particular frequency range. The thickness or composition of ballistic-resistant layer 24, therefore, may be decreased to maintain the overall loss tangent of armored radome 10 within acceptable limits.

Intermediate layer 28, backing layer 30, and/or backing layer 32 may be made of a material having an intrinsic dielectric constant that is relatively less than the material from which ballistic-resistant layer 24 is formed for impedance matching armored radome 10 to its associated antenna electronic unit 14. As described previously, a particular ballistic-resistant layer 24 formed of a ceramic material including aluminum-oxide may have a dielectric constant greater than six. Thus in particular embodiments in which ballistic-resistant layer 24 is formed of a ceramic material including aluminum-oxide, intermediate layer 28, backing layer 30, and backing layer 32 may be made of a material, such as cyanate ester/quartz having a dielectric constant that is less than approximately three. Thus, the thickness of intermediate layer 28, backing layer 30, and/or backing layer 30 may be chosen to achieve an overall impedance of armored radome 10 matching that of its associated antenna electronic unit 14.

In a particular embodiment, armored radome 10 is designed for operation within the Ka-band, which may include frequencies in the range of approximately 32 to 37 Giga-Hertz. In this case, ballistic-resistant layer 24 may be formed of a 1.0 inch thick layer of ceramic including aluminum-oxide as a base material, rigid layer 26 may be formed of a 0.25 inch thick layer of honeycomb base material made of cellulose and filled with syntactic foam material 42, while intermediate layer 28, backing layer 30, and backing layer 32 may include a cyanate ester/quartz material that are 0.05 inches, 0.10 inches, and 0.05 inches thick, respectively.

Figures 3A, 3B, 3C:
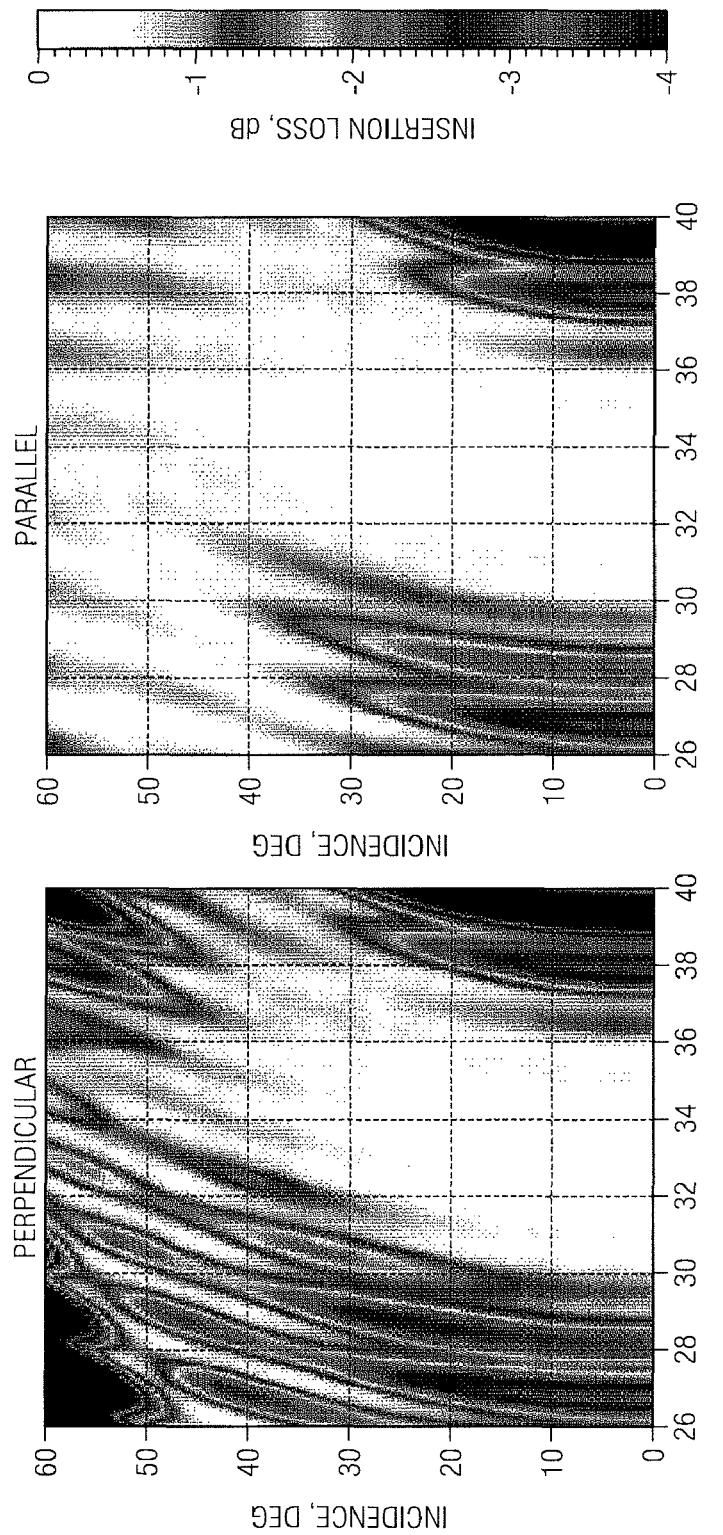
FIGS. 3A and 3B are graphs showing calculated insertion loss values of perpendicular and parallel components of electromagnetic radiation at various angles of incidence through the armored radome of FIG. 2.
FIG. 3C is the loss magnitude bar associated with FIGS. 3A and 3B.

FIGS. 3A, 3B, and 3C are graphs showing calculated insertion loss values of electromagnetic radiation at various angles of incidence through a particular armored radome 10 constructed according to the previously described characteristics. In particular, FIG. 3A shows an expected loss tangent of electromagnetic radiation perpendicular to armored radome 10, while FIG. 3B shows an expected loss tangent parallel to the surface of armored radome 10. FIG. 3C is a linear chart that relates the various shading levels to their associated loss tangent values. As can be seen, the particular armored radome 10 exhibits relatively little attenuation of electromagnetic radiation within the Ka-band of operation.

Modifications, additions, or omissions may be made to armored radome 10 without departing from the scope of the invention. The components of armored radome 10 may be integrated or separated. For example, backing layers 30 and 32 may each include multiple layers of differing types of material that may be combined together or may include one or more coatings of a suitable material that are applied prior to assembly on armored radome 10. Moreover, the operations of armored radome 10 may be performed by more, fewer, or other components. For example, environmental radome 22 is included for additional protection of antenna electronic unit 14; however, environmental radome 22 may be omitted if this additional protection is not needed or desired.

Although the present invention has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:
1. A radome comprising:
a ballistic-resistant layer that is configured to extend over an opening of an antenna, the ballistic-resistant layer made of a ceramic material comprising aluminum-oxide and having a dielectric constant greater than six;
a rigid layer disposed adjacent to the ballistic-resistant layer, the rigid layer comprising a honeycomb base material having a plurality of holes that extend transversely to the surface of the ballistic-resistant layer, the plurality of holes being filled with a syntactic foam material with a dielectric constant that is less than three;
a first backing layer disposed adjacent to the ballistic-resistant layer opposite the rigid layer and opposite the antenna, the first backing layer and the ballistic-resistant layer together having a tensile strength in an amount greater than that of the ballistic-resistant layer alone;

an intermediate layer disposed between the ballistic-resistant layer and the rigid layer; and a second backing layer disposed adjacent to the rigid layer opposite the ballistic-resistant layer, wherein the first backing layer, intermediate layer, and the second backing layer are each made of a material having a dielectric constant that is lower than the dielectric constant of the ballistic-resistant layer, wherein the second backing layer is made of cyanate ester or quartz.

2. The radome of claim 1, wherein the honeycomb base material is made of cellulose.

3. The radome of claim 1, wherein each of the plurality of holes is approximately ⅛ inch in diameter.

4. The radome of claim 1, wherein the rigid layer is approximately 0.4 inches thick.

5. The radome of claim 1, wherein the ballistic-resistant layer is approximately 1 inch thick.

6. The radome of claim 1, wherein the rigid layer is a single, continuous layer, and all honeycomb base material in the radome is disposed within the single, continuous layer.

* * * * *